United States Patent
Huber

[19]

[11] Patent Number: 6,082,183

[45] Date of Patent: Jul. 4, 2000

[54] TEST ASSEMBLY FOR FLUID TIGHT INTEGRITY OF PIPELINE JOINT

[76] Inventor: Donald G. Huber, P.O. Box 64160, Tacoma, Wash. 98464

[21] Appl. No.: 09/357,667

[22] Filed: Jul. 20, 1999

Related U.S. Application Data

[60] Provisional application No. 60/093,682, Jul. 22, 1998, provisional application No. 60/102,372, Sep. 29, 1998, and provisional application No. 60/120,523, Feb. 17, 1999.

[51] Int. Cl.[7] .............................. F16K 7/00; F16K 43/00; G01M 3/04; F16L 55/12

[52] U.S. Cl. ................................. 73/49.1; 73/46; 73/49.8; 137/254; 220/234; 277/315; 277/320; 285/108; 138/90

[58] Field of Search ...................... 73/49.1, 49.8, 73/40.5 R, 46; 137/254; 285/108, 110, 123.12; 220/234; 138/90; 277/315, 907, 320, 327

[56] References Cited

U.S. PATENT DOCUMENTS

| | | | |
|---|---|---|---|
| 1,720,819 | 7/1929 | Cohen. | |
| 1,948,220 | 2/1934 | Kennedy. | |
| 3,091,259 | 5/1963 | Alessio. | |
| 3,327,379 | 6/1967 | Clements. | |
| 3,467,271 | 9/1969 | Kaiser et al. | 220/24.5 |
| 3,712,115 | 1/1973 | Miller | 73/49.1 |
| 3,766,947 | 10/1973 | Osburn | 138/89 |
| 3,919,880 | 11/1975 | Seyd et al. | 73/49.8 |
| 4,132,111 | 1/1979 | Hasha | 73/46 |
| 4,194,721 | 3/1980 | Nachtigahl | 251/148 |
| 4,203,473 | 5/1980 | Roberson, Sr. | 138/93 |
| 4,376,597 | 3/1983 | Britton et al. | 405/195 |
| 4,407,171 | 10/1983 | Hasha et al. | 73/46 |
| 4,429,568 | 2/1984 | Sullivan | 73/49.8 |
| 4,542,642 | 9/1985 | Tagliarino | 73/40.5 R |
| 4,602,504 | 7/1986 | Barber | 73/49.8 |
| 4,607,664 | 8/1986 | Carney et al. | 138/89 |
| 4,624,131 | 11/1986 | Holm et al. | 73/46 |
| 4,658,861 | 4/1987 | Roberson, Sr. | 138/90 |
| 4,706,482 | 11/1987 | Barber | 73/49.8 |
| 4,763,510 | 8/1988 | Palmer | 73/40.5 R |
| 4,821,559 | 4/1989 | Purpora | 73/40.5 R |
| 4,848,155 | 7/1989 | Huber | 73/49.8 |
| 4,887,646 | 12/1989 | Groves | 138/90 |
| 4,890,483 | 1/1990 | Vetter | 73/40.5 R |
| 4,936,350 | 6/1990 | Huber | 138/90 |
| 5,033,510 | 7/1991 | Huber | 138/90 |
| 5,076,095 | 12/1991 | Erhardt | 73/49.8 |
| 5,163,480 | 11/1992 | Huber | 138/94 |
| 5,181,543 | 1/1993 | Hendzel | 138/90 |
| 5,287,730 | 2/1994 | Condon | 73/49.8 |
| 5,323,641 | 6/1994 | Tolliver et al. | 73/46 |
| 5,507,501 | 4/1996 | Palmer | 277/9 |
| 5,740,830 | 4/1998 | Mankins | 137/15 |
| 5,844,127 | 12/1998 | Berube et al. | 73/49.8 |
| 5,927,762 | 7/1999 | Webb | 285/123.15 |

*Primary Examiner*—Hezron Williams
*Assistant Examiner*—J. David Wiggins
*Attorney, Agent, or Firm*—Garrison & Associates PS; David L. Garrison

[57] ABSTRACT

An improved system for the non-destructive testing of the fluid tight integrity of an installed fluid transfer line such as a drain pipe or vent and wastewater system of a building. A removable test baffle is held in place between ends of adjacent sections of an installed fluid transfer line to isolate a portion of the line for testing. The test system comprises a baffle carriage, a removable test baffle, and a sleeve adapted to engage the outer surfaces of the adjacent sections to seal the junction and the test installation from leaking and optionally to provide one or more gaskets between the section ends and the baffle carriage. In optional preferred embodiments of the test system the baffle carriage is an integral part of the sleeve. Preferred baffles for use with the invention are flexible, of larger diameter than the fluid line, and comprise dual-gasket sealing means and means for removal of the baffles from either side of the test seal. Baffles according to the invention may be completely removed from the fluid transfer line after testing, without risk of blocking or obstructing the fluid line.

17 Claims, 7 Drawing Sheets

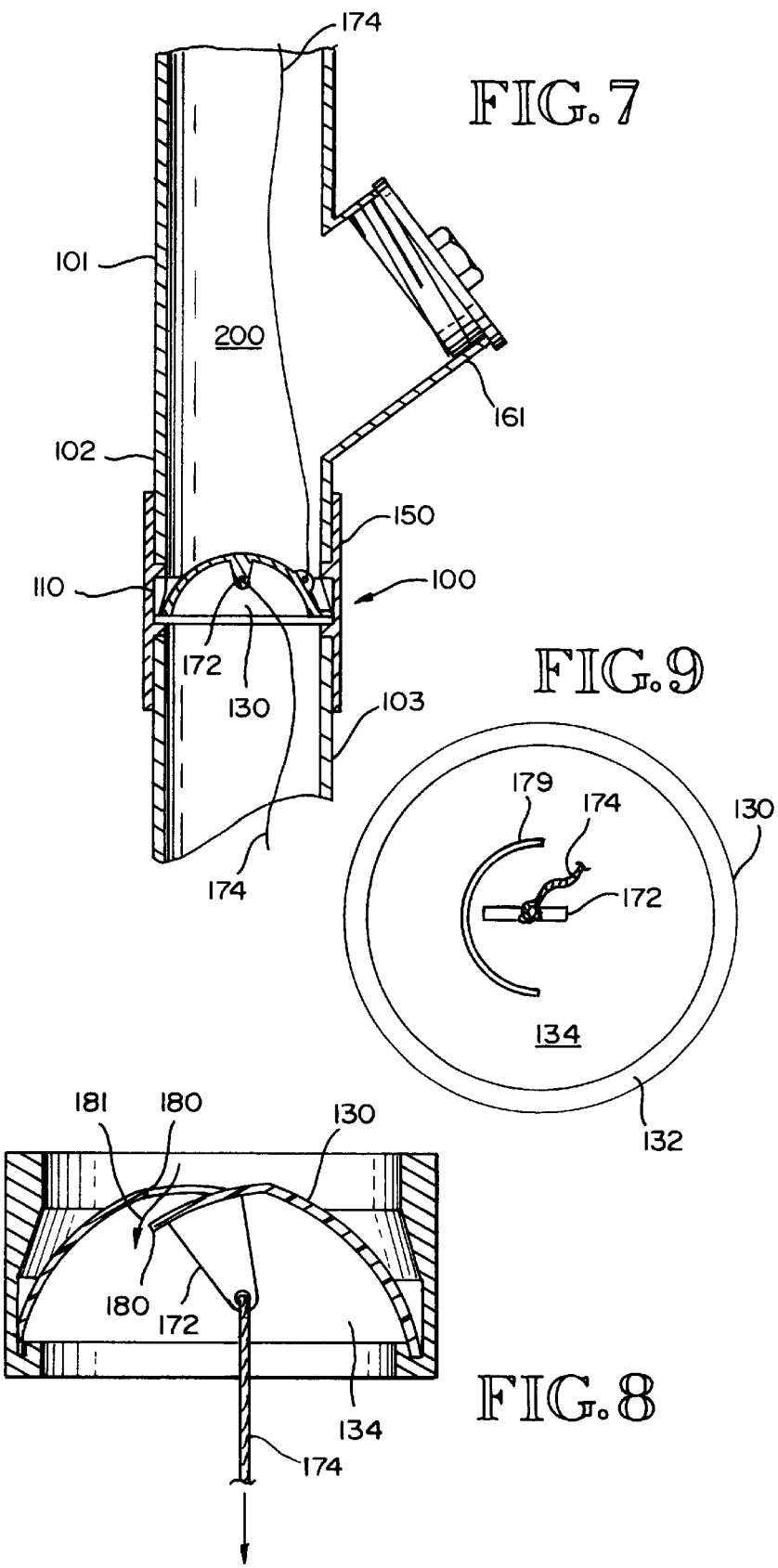

TEST ASSEMBLY FOR FLUID TIGHT INTEGRITY OF PIPELINE JOINT

This application claims the benefit of U.S. provisional applications Ser. No. 60/093,682, entitled Test System for Fluid Tight Integrity of Installed Pipeline, filed Jul. 22, 1998; Ser. No. 60/102,372, filed Sep. 29, 1998, and entitled Test Assembly for Fluid Tight Integrity of Pipeline Joint; and Ser. No. 60/120,523, filed Feb. 17, 1999, and entitled Test Assembly for Fluid Tight Integrity of Pipeline Joint.

TECHNICAL FIELD

The invention relates to the testing of pipes and other fluid transfer lines; more particularly, it relates to method and apparatus for non-destructive pressure testing of installed pipelines. A principal application of the invention is in the testing of drain systems and other building plumbing lines.

BACKGROUND OF THE INVENTION

In the construction of buildings and mechanical systems, a newly installed or repaired fluid transfer system or system component, as for example a building plumbing or sewage system, must frequently be isolated from a larger system until the fluid-tight integrity of the new section is tested, generally by subjecting the system to an increased fluid pressure to locate any leaks. In building construction, system tests of this kind are often required for certification of compliance with building code requirements. The inherent difficulty of making such pressure tests is often aggravated by the fact that some portion of the new installation is embedded in a wall or is buried, obstructed by other components, or otherwise difficult to access at the time the test is to be conducted. Thus a vexing question has been posed by the need to seal selected portions of such systems in order to accommodate testing without permanent obstruction or other damage to the system.

Various attempts have been made at providing systems or means for conducting such tests. In particular, several patents have been issued disclosing test or isolation valve assemblies used in the inspection of drain systems prior to connection of the systems to sewer lines.

Sullivan U.S. Pat. No. 4,429,568, discloses a closure plug for pressure testing a liquid drain and vent plumbing type system. Sullivan uses a clean-out Y for access to open the plug plate assembly.

Cohen U.S. Pat. No. 1,720,819, discloses a test tee having a tapered gate which closes off a house drain pipe from a drainage system. After the test has been completed, the gate is removed from the test tee and the resulting opening in the tee is closed by a cover plate.

Tagliarnio U.S. Pat. No. 4,542,642, discloses a test tee having a plug which is a removable blocking disk. The blocking disk engages a ledge in the test tee and seals the drainage system. The diaphragm is accessible and removable through an access means.

Roberson U.S. Pat. No. 4,658,861, discloses a pneumatic plug inserted through a clean-out tee to block off a house service line to the main sewer line.

Kennedy U.S. Pat. No. 1,948,220, discloses a test plumbing system using a flap valve which is pivoted at an upper side of the valve seat. The flap valve is held in position by a valve adjusting rod.

Barber U.S. Pat. No. 4,602,504, shows a permanently installed test fitting in which a seal diagram has a frangible, removable portion which may be broken away from the diaphragm and removed to permit service use of the system. A portion of the seal diaphragm remains permanently in the conduit with its edge exposed, posing a continuous threat of blockage and obstruction. Moreover, improvements in the sealing means disclosed in Barber would better suit the test fitting for use as a permanent, fully functional, non-leaking portion of the fluid transfer system in which it is used. In addition, Barber discloses no means for removing the sealing means through an extended length of installed fluid line. Barber U.S. Pat. No. 4,706,482 adds to this apparatus for monitoring pressure within the test portion of the fluid line.

Nachtigahl U.S. Pat. No. 4,194,721 discloses a plumbing test fitting having a closure plate adapted to be slidably fitted between a pair of spaced adjacent ends of a pair of pipes, the joint being sealed by a detachable sealing clamp which also sealably bears against the periphery of the closure plate. A test fitting of this type is not well adapted to permanent placement in the fluid line, so that a fluid-tight system, once tested, would have to be disturbed and re-worked once testing was complete.

Hasha U.S. Pat. No. 4,132,111 discloses a method and apparatus for leak testing. The Hasha apparatus comprises a system of annular longitudinally-spaced sealing members disposed on the exterior of the pipe to test the integrity of joints without attempting to stay fluid flow in the interior of the fluid line.

Miller U.S. Pat. No. 3,712,115 discloses pipe testing apparatus comprising a pair of upper and lower elongate spacer bar to form a pipe testing assembly.

These references relate to the general field of disclosure of this invention but many suffer from the permanent presence of apparatus in the conduit which can catch refuse and cause pluggage.

More recently, U.S. Pat. Nos. 4,848,155, 4,936,350, 5,033,510, and 5,163,480 to Huber have disclosed various apparatus for isolating and testing plumbing installations. It has been noted, however, through usage of the devices disclosed therein, that improvements might be made in the effectiveness of the seal provided in the test section, particularly by the test baffle and around the test device itself, and in means and method for removal of the baffle after the test has been completed. It has also proved possible to improve the flexibility of the baffles disclosed therein, without sacrificing the strength or pressure-resistant capabilities of the baffles, in order to facilitate easier and more efficient removal of the baffles from the fluid line following testing.

Other attempts have included glued-in or molded "cookies" to seal flow within a pipe, in the same general manner as the baffles described in the Huber references above, and inflatable balloon inserted into the fluid line and filled with air or water to block flow. "Screw-in" threaded type plugs have been tried as well, as have dual-plate devices comprising a pair of flat plates attached through their centers by a coaxial tightening device. But glued or molded cookies are often inconvenient to use, and after removal leave behind portions of the baffle which thereafter permanently block part or all of the flow within the fluid line; and they also not infrequently get stuck themselves on removal, requiring dismantlement of the fluid line itself or causing permanent flow obstructions. Inflatable balloons rarely seal the fluid line effectively, especially under moderate or high pressures, such that leakage is a common and continual problem, and testing is rarely fully effective—and typically messy or hazardous, as leaked fluid must be cleaned up or (in the case of gasses) is irretrievably introduced to the atmosphere, Threaded plugs rarely allow testing of an installed system in the form in which it will be used, thus providing at best incomplete test results; and dual-plate devices, which generally comprise substantially rigid plates having flexible polymeric perimeters, often seat themselves on dirt, rust, and other irregularities or obstructions within the fluid line, resulting again in leakage and incomplete or inaccurate testing as well as clean up or environmental hazards.

Thus it may be seen that there exists a need for an improved system for the non-destructive and non permanently-obstructing testing of the fluid tight integrity of an installed fluid transfer line such as a drain pipe or vent and wastewater system of a building. In particular, there is a need for the provision of such a system in a simple and economical form which provides an improved permanent external seal and which makes use of an improved test baffle. There is additional need for such a system which does not require the employment of a T- or Y-fitting for access to or removal of the test baffle, or for separate access covers, and which does nor require the replacement of parts or seals following completion of the test or the use of pneumatic or otherwise inflatable apparatus in performing the test.

DISCLOSURE OF THE INVENTION

Accordingly, it is an object of the invention to provide an improved system for the non-destructive and non permanently-obstructing testing of the fluid tight integrity of an installed fluid transfer line such as a drain pipe or vent and wastewater system of a building. It is a particular object of the invention to provide such system in a simple and economical form which provides an improved, permanent extern al seal and which makes use of an improved test baffle. It is a further object of the invention to provide such a system which does not require the employment of a T- or Y-fitting for access to or removal of the test baffle, or for separate access covers, and which does nor require the replacement of parts or seals following completion of the test or the use of pneumatic or otherwise inflatable apparatus in performing the test.

The invention provides an improved system for the non-destructive testing of the fluid tight integrity of an installed fluid transfer line such as a drain pipe or vent and wastewater system of a building. A removable test baffle is held in place between ends of adjacent sections of an installed fluid transfer line to isolate a portion of the line for testing. The test system comprises a baffle carriage, a removable test baffle, and an optionally separate sleeve adapted to engage the outer surfaces of the adjacent sections of the fluid line to seal the junction and the test installation from leaking, and optionally to provide one or more gaskets between the section ends and the baffle carriage, to prevent galling and leakage. In optional preferred embodiments of the test system the baffle carriage is an integral part of the sleeve. Preferred baffles for use with the invention are flexible, of larger diameter than the fluid line, and comprise dual-gasket sealing means and means for removal of the baffles from either side of the test seal. Baffles according to the invention may be completely removed from the fluid transfer line after testing, without risk of blocking or obstructing the fluid line or potential fluid flow therethrough. The test baffle preferably comprises a pair of gaskets to improve the effectiveness of the baffle in sealing or isolating the line and a domed central web to facilitate testing at increased pressures. The test baffle optionally further includes a lightweight, low cost ribbed construction and a means for removing the baffle from either the convex or concave side of the dome without leaving behind any portion of the baffle to impair fluid flow within the line. On removal, the baffle is flexed into a saddle shape and removed from the line without need for dismantlement of the line.

In one aspect the invention provides a test system for non-destructive testing of the fluid-tight integrity of an installed fluid transfer line. In general, the system comprises a baffle carriage, a generally flexible, removable test baffle, and a sleeve.

The baffle carriage according to this aspect of the invention is adapted for disposition between the ends of two or more adjacent sections of a fluid transfer line and for releasably retaining a test baffle in such a disposition. Most generally the fluid line, the baffle carriage, and all other essential features of the test system are substantially circular, as are most fluid lines such as plumbing lines, pipes, air lines, etc. An interior surface of the baffle carriage comprises a circumferentially disposed recessed seat and a recessed sidewall proximate said seat. The seat and sidewall act together in conjunction with the test baffle to seal the test portion of the fluid line to facilitate testing of the integrity of the fluid line. The carriage also preferably acts to retain the baffle prior to installation, so that the carriage and baffle may be handled as a single unit for packaging, distribution, transportation, and installation. In preferred embodiments the sidewall of the baffle carriage comprises a frusto-conical annular surface, the surface being adapted for facilitation of the removal of the test baffle after completion of testing. In some applications it is advantageous to provide the baffle carriage in the form of two or more separate parts, a first portion comprising the recessed seat and sidewall for releasable engagement of the test baffle, and a second portion comprising a frusto-conical annular inner surface for facilitating removal of the test baffle. Producing the carriage in multiple pieces can facilitate fabrication of the test system, since re-entrant recesses and other molding and manufacturing difficulties may be reduced or eliminated altogether, and other economies may be realized. Following removal of the test baffle the carriage acts as a conduit segment, and generally is left in place to form a permanent part of the fluid line, much as any other pipe or line segment.

The test baffle according to this aspect of the invention preferably is flexible, substantially circular, and has a diameter larger than an inner diameter of the ends of said fluid transfer lines. The baffle comprises a first gasket, a perimeter, and a central web. The first gasket is adapted to sealingly engage the seat of the baffle carriage. The perimeter comprises a second gasket adapted to sealingly engage the sidewall of the carriage, and thereby to assist the first gasket in sealing the test section of the fluid line and releasably retaining the baffle in the carriage during storage, transportation, installation, etc. The first and second gaskets cooperate, when the test baffle is placed within the conduit with the first gasket in contact with the seat, so that application of a pressure against said test baffle results in an improved seal between both the second gasket and the seal wall, and between the first gasket and the seat, resulting in an extremely effective and efficient seal for isolation of the fluid line. The central web of the baffle is attached to the gaskets in a fluid tight engagement, so as to effect fluid-tight isolation of that portion of the fluid line to be tested.

Preferred embodiments of the baffle have diameters larger than the inner diameter of the fluid line and at least as small as the inside diameter of the sidewall of the carriage, but preferably larger than the outside diameter of the seal seat Thus to facilitate removal of the test baffle, the baffle is typically composed of a flexible material. The central web of the baffle may be flat but is preferably formed with a convex surface such as a dome, or a conical or partly spherical configuration, the convex surface being adapted to withstand increased pressures and thus preferably being oriented toward the portion of the line to be tested. The web may be formed separately and attached to the gaskets, or may be molded or formed as integral or separable parts with them.

Prior art baffles comprise only a single seal, a gasket around the perimeter of the seal to engage the seat in the conduit wall. Preferred baffles according to the invention comprise a second seal, this seal being disposed around the perimeter of the seal in a position to engage the seal wall which constitutes an outer limit to the conduit seal seat, and thus improved fluid-tight integrity in the seal between the test baffle and the conduit. Preferably, both the first seal and this second gasket seal engage the conduit when the baffle is first installed. As pressure is applied inside the conduit, both seals are pushed into heavier contact with the baffle carriage: the second seal is pushed into heavier contact with the seal wall as a result of pressure within the conduit pushing the gasket directly into the seal wall, while pressure against the central web causes the baffle to push harder against the conduit seal seat, further improving the seal between the baffle and the conduit. Thus the first and second seals or gaskets work together in improving the overall quality of the baffle as a seal between the pressurized portion of the conduit and the outside of the system. In some cases, the first gasket is referred to as a high pressure seal and the second gasket as a low pressure seal because of the tendency of the second gasket to deform more substantially under an initial pressure build-up (when presumably pressures are yet relatively low) and the tendency of the first gasket to take an increasing share of the pressure load as pressure continues to increase.

A preferred configuration for the central web of the baffle is a pressure resistant dome, generally of spherical or part-spherical shape. In order to save weight, material, and costs while maintaining the ability of the dome to withstand moderate to high testing pressures, either side of the dome optionally comprises a plurality of ribs extending radially from the center of the dome, which generally coincides with the center of the web, to the perimeter of the baffle. These ribs serve to stiffen the dome while allowing less material to be used in fabrication of the web.

In alternative preferred embodiments of the invention the perimeter of the baffle and the carriage seat further comprise, between them, a dependent circumferential skirt and a circumferential channel adapted for releasable interengagement of the skirt, whereby the baffle may be releasably attached to the carriage. Although preferably the channel is provided on the carriage and the skirt on the test baffle, as shown in the Figures, due to economies in the manufacture and convenience in the assembly and use of the test system, and structural advantages in supporting pressures during tests, the skirt and channel may alternatively be located in the reverse sense as well, with only small penalty in economy and convenience.

Preferred embodiments of the test baffle optionally comprise a removal lug having a frangible base portion adapted to tear away from the central web of the baffle in order to release a fluid and thereby relieve a fluid pressure contained behind the baffle prior to dislodgment or unseating of the baffle for removal. Most preferably, the base portion is only partially frangible, so that an initial pulling on the removal lug causes a partial breach in the baffle web and bleeding of pressure, while continued pulling on the same removal lug will result in complete removal of the baffle. Frangible base portions may be provided in a number of ways well known in the art, the most economical and therefore among the most preferred methods being to provide a scored line in the web, so that a line of reduced web thickness is created. Pulling of the removal lug in such configurations results in tearing of the web along the score line.

The sleeve according to this aspect of the invention is adapted to provide an external seal for the test system, ensuring that joint(s) between the baffle carriage and the fluid line are fluid tight, and optionally to aid in the retention and alignment of the carriage and test baffle. The sleeve generally comprises two ends and a substantially circular inner surface adapted by means of its size and shape to accept within the interior of the sleeve the baffle carriage, and to sealingly engage the outer surface of those sections of fluid transfer line adjacent to the carriage in such a manner as to prevent leakage from the fluid line. In doing so, the sleeve holds the carriage in substantially coaxial relation to the ends of the fluid line. Preferably the sleeve further includes, on its inner surface, at least one radially-depending integral gasket adapted for disposition between the carriage and one of the ends of the fluid line, so as to act as a gasket between them. In preferred embodiments, the sleeve comprises two such gaskets, so spaced and shaped as to accommodate the carriage between them and to hold the carriage in place during transportation, installation, and storage. By sealing the joint between the carriage and the fluid line, when it is disposed between the ends of the fluid line, the sleeve helps to assure that a test pressure may be induced within the fluid line and may be sealingly resisted by the removable test baffle, in order to facilitate pressure testing of the line, and helps to provide permanent fluid tight integrity for the installed fluid line following testing.

The sleeve is preferably long enough, particularly in those embodiments comprising integral gaskets for engagement or retention of the baffle carriage, that the ends of the sleeve overlap the ends of adjacent sections of the fluid line to ensure that all sealing requirements, including compliance with building codes in embodiments used in plumbing systems, are met.

Optional alternatively preferred embodiments of the sleeve further comprise a circumferentially disposed recessed seat and a recessed sidewall proximate the seat, the seat and said sidewall being adapted to releasably engage the test baffle in the manner described above for the sleeve. That is, alternative embodiments of the sleeve may comprise a baffle carrier integrally formed on their inner surface. Thus the functions of the sleeve and of the baffle carrier may be served by a single part. Like the carriage, preferred embodiments of such combination parts comprise a frusto-conical annular surface adapted for facilitation of the removal of the test baffle.

Preferred embodiments of the invention further comprise means for removing the baffle from the fitting or baffle carriage and the fluid transfer system following testing of the system, without need for dismantling the system. The removal means may comprise a line or cord which is attached to the baffle and operated by pulling to remove the baffle from the conduit. The removal means may extend from the test baffle along the fluid line to an exit, filling, or cleaning port, or to an end of an unfinished segment of the fluid line. Alteratively, a hook or other suitable tool may be used to engage and remove the baffle through an adjacent port.

The removal means preferably further comprises one or more lugs integrally formed with or otherwise attached to the baffle, preferably to the central web. Such lugs are disposed on either the convex or the concave sides of dome-shaped webs, and in particularly preferred embodiments of the invention offering maximum flexibility for installation and testing, are located on both sides. In such embodiments the removal means comprises a first removal lug disposed upon a concave side of said dome and/or a second removal lug disposed upon a convex side of said dome. The lugs are adapted to be engaged by a removal tool which comprises, for example, either a string or line or a hook adapted to engage an eye in one or both of the lugs, or a removal line attached to one of the lugs, such a removal line comprising a float adapted to hold an end of said line at a surface of a fluid located inside the system, as for example at a cleaning port in a plumbing drain system. It has been found to be particularly advantageous to position such lugs near the perimeter of the baffle. Placing a lug and particularly a lug located on the convex side of the dome, near the perimeter of the baffle permits relatively easy breaching of the seal once the test is completed, so that any residual differential pressure may bleed of to the unpressurized side of the seal, thus at least initially equalizing the pressure on both sides of the baffle and facilitating easing removal of the remainder of the baffle from its seat. Eccentric placement of the lug also facilitates bending of the baffle during removal to ease passage of the baffle through any portions of the conduit between the isolation or test site and the system exit, and reduces the possibility and severity of snags which might occur during removal. Lugs disposed on the concave side of the test baffle are most advantageously located at or near the center of the dome, to facilitate collapse and flexing of the dome as it is pulled through the gasket/perimeter portion of the baffle.

An optional additional feature of the test system according to the invention is a removable retainer adapted for restraining a removal line attached to a baffle removal lug during installation of the test system. Such a retainer may be provided as a part of a test baffle assembly, for insertion within the fluid line, or within a carriage according to the invention, prior to testing. The retainer serves to hold the removal line out of the way during handling and installation of the test baffle. When installation of the baffle or of the assembly is complete, the retainer is removed, thus releasing the removal line, which may then be passed through a removal port as described herein.

It is contemplated that a principal application for the invention will be in drain systems and other building plumbing lines. In these and other applications the invention will frequently compose a permanent fixture in the fluid transfer line. Thus such embodiments will be fabricated from materials having sufficient strength, durability, and resistance to corrosion, temperature expansion or contraction, and the like, to serve the fluid transfer purpose indefinitely, in the same manner as the remainder of the fluid transfer system.

BRIEF DESCRIPTION OF THE DRAWINGS

FIG. 7 is a partial cross-sectional schematic view of a preferred embodiment of the invention configured for testing of a fluid transfer line.

FIG. 8 is a cutaway schematic view of an alternative preferred embodiment of the baffle carriage and test baffle according to the invention.

FIG. 9 is a schematic view of an alternative preferred embodiment of a test baffle according to the invention, taken as along view 9—9 in FIG. 8 prior to breaking of the frangible base portion of the removal ear.

BEST MODE OF CARRYING OUT THE INVENTION

Figure 1:
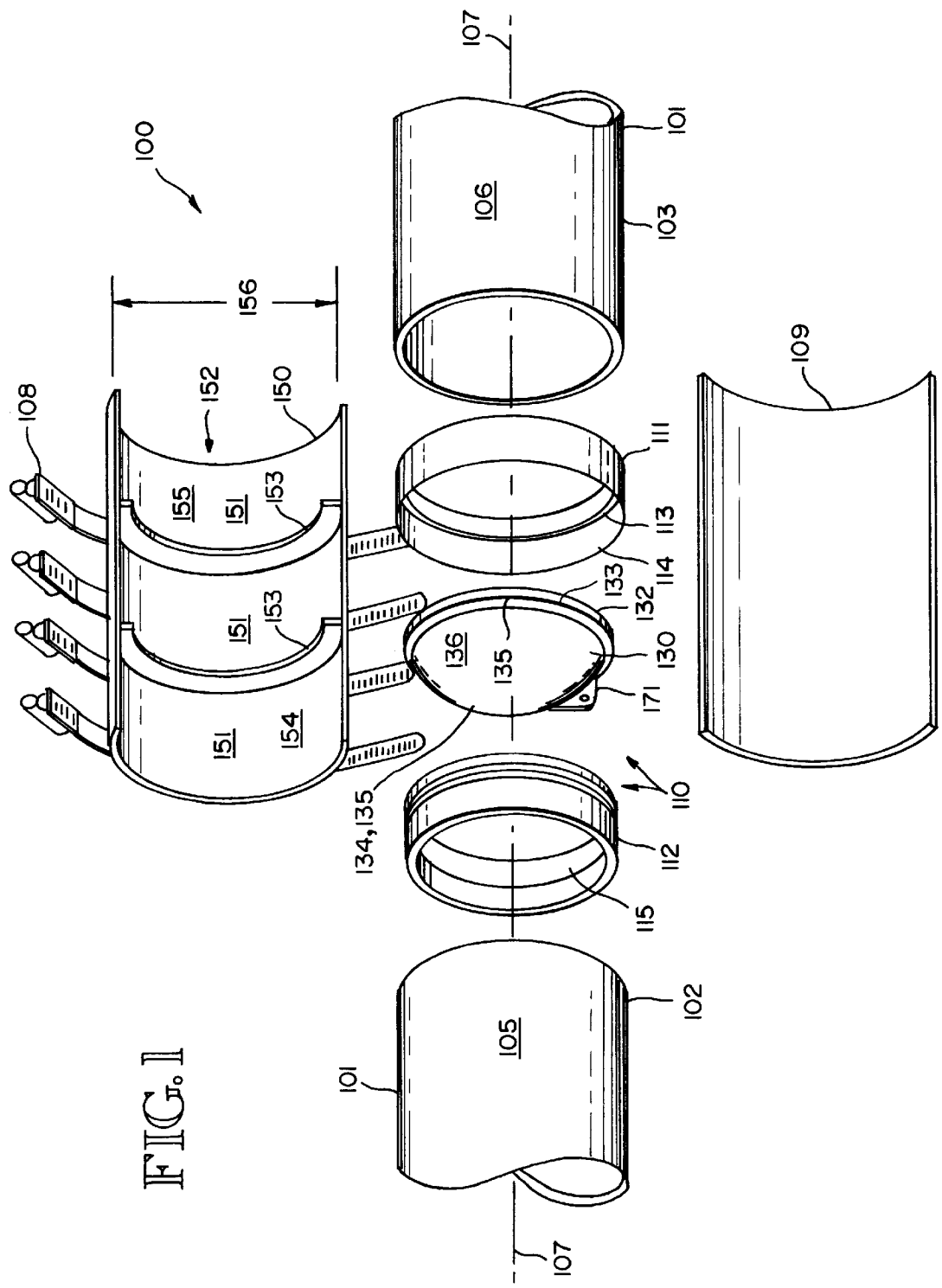
FIG. 1 is an exploded schematic view of a preferred embodiment of a test system according to the invention.

For purposes of this disclosure, fluid includes any aggregation of matter in which the molecules are able to flow past each other without limit and without the formation of fracture planes, or which is capable of flowing and which changes shape steadily when acted upon by a force tending to change its shape, and includes, without limitation, any liquid or gas.

Fluid line means any pipe, tube, conduit, duct, or other fixed vehicle for the transportation or guided transfer of a fluid.

Turning now to the drawings, the invention will be described in a preferred embodiment by reference to the numerals of the drawing figures wherein like numbers indicate like parts.

FIG. 1 is an exploded schematic view of a preferred embodiment of a test system according to the invention. Test system 100 comprises baffle carriage 110, comprised in the embodiment shown of two portions 111 and 112, removable test baffle 130, and sleeve 150 (shown partially, in section), is adapted to join and temporarily seal fluid line 101. Fluid line 101 comprises end sections 102 and 103. Optional components of test system 100 comprise clamps or other binding means 108, which serve to hold sleeve 150, and thus carriage 110 and baffle 130, in place; and sheathing 109, which helps hold test system 100 in place and also serves to protect sleeve 150 from galling or other damaging contact by binding means 108.

As shown in the Figure baffle carriage 110 and baffle 130 are disposed co-axially to fluid line 101 along axis 107, and in correct position (in a radial sense) for installation of the test system.

Figure 2:
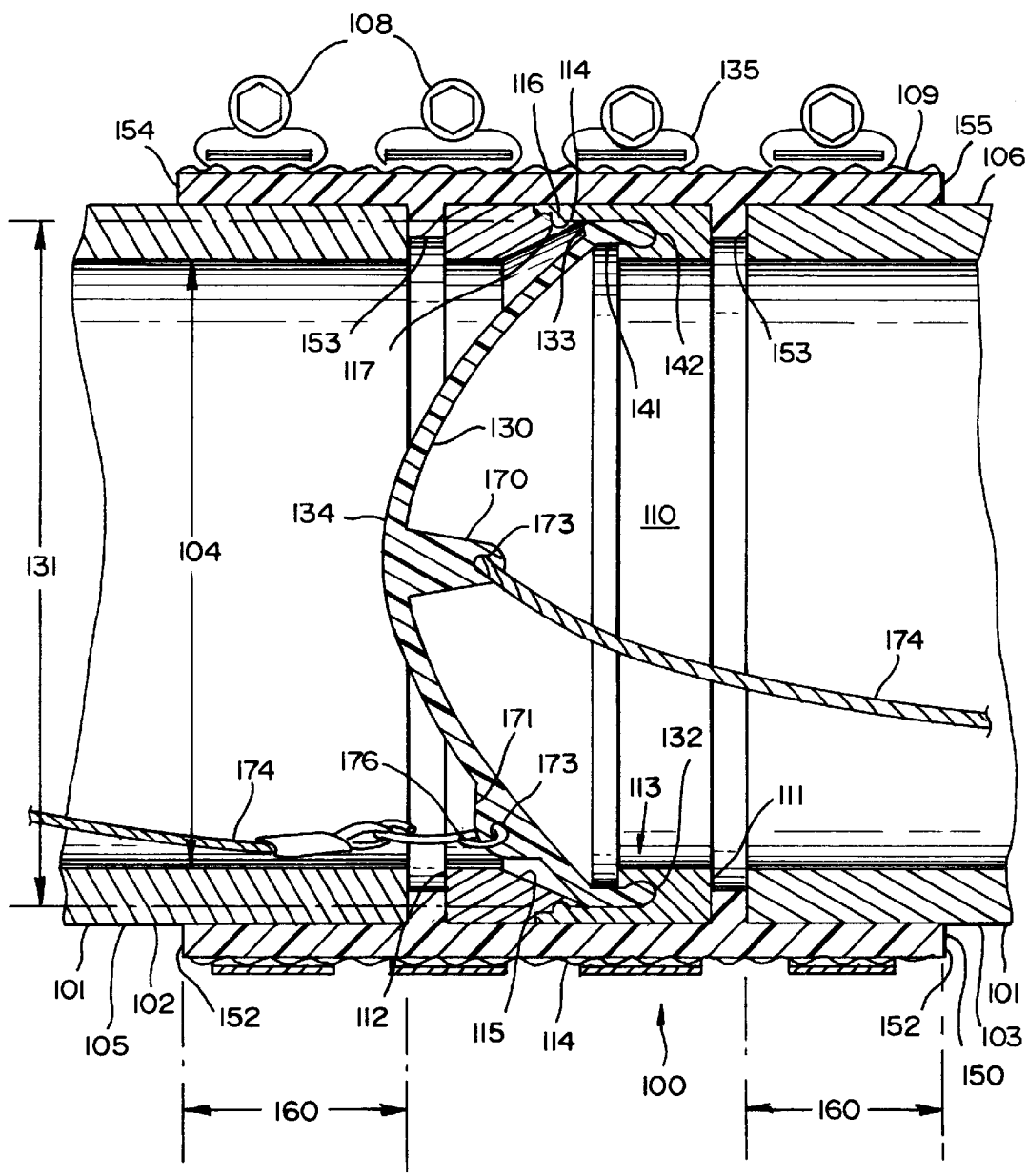
FIG. 2 is a cross-sectional view of a preferred embodiment of a test system according to the invention.

FIG. 2 is a cross-sectional view of the test system of FIG. 1 in an assembled or installed configuration. Test baffle 130 is in sealing engagement with first portion 111 of baffle carriage 110, with first gasket or high-pressure seal 132 engaging seat 113 of the carriage and second gasket or low pressure seal 135 on perimeter 133 of the baffle engaging sidewall 114 of the carriage. In the embodiment shown, this is accomplished by inserting dependent skirt 141, which includes first gasket 132 of the baffle, into channel 142, which is disposed on first portion 111 of carriage 110. Second portion 112 of carriage 110 is in place next to and releasably engaged by first portion 111 of the carriage.

Releasable engagement of the first and second portions of the carriage is facilitated by raised radial rim 116 on first portion 111, which engages mating channel 117 on the outer surface of second portion 112. With first and second portions of carriage 110 thus engaged, second portion 112 aids first portion 111 in retaining baffle 130, so that the entire carriage-baffle assembly may be handled and installed conveniently as a single unit. Because the diameter of second gasket 135 is greater than diameter 131 of the perimeter of the baffle, but between the diameter of sidewall 114 and the diameter of the seal seat, second gasket 135 is deformed to a greater or lesser extent from its nominal shape when the test baffle is in place. The deformation of the second gasket when the baffle is put in place provides an improved, positive seal for completion of testing of the fluid line of which conduit 101 forms a part.

In FIG. 2 carriage 110 and baffle 130 are coaxially aligned with fluid line 101, and are held in place by sleeve 150. First end 154 of sleeve 150 is disposed about and is in sealing engagement with outer surface 105 of end 102 of one section of fluid line 101. Similarly, second end 155 of sleeve 150 is disposed about and is in sealing engagement with outer surface 106 of end 103 of a second section of fluid line 101. Gaskets 153, which are integrally formed on inner surface 151 (FIG. 1) of sleeve 150, serve to enhance the seal by interposing between ends 102 and 103 of the fluid line and baffle carriage 110. Clamps or binding means 108 are in place about sheathing 109, which is wrapped about the outer surface of sleeve 150. Clamps 108 and sheathing 109 provide additional strength and security to the joint between the carriage and the fluid line, and serve to enhance the seal between of those portions as well.

Ends 152 of sleeve 150 are of sufficient length that they overlap the ends of adjacent sections 102 and 103 of fluid line 101 with a length 160 sufficient to ensure that all sealing requirements, including compliance with building codes in embodiments used in plumbing systems, are met. The particular length 160 of ends 152 will vary depending upon the application to which a particular fluid line is to be put, the nature of the testing to be performed, and any applicable code or design requirements. The selection of a suitable length is well within the ability of a designer of ordinary skill in the art, once armed with this disclosure and any applicable requirements.

In FIG. 2 it is further seen that diameter 131 of baffle 130 is larger than diameter 104 of fluid line 101, and at least as large as the inner diameter of sidewall 114 of the baffle carrier.

With baffle 130 in place as shown in FIG. 2 and retained by carriage 110 and sleeve 150, and supplementally by binding means 108 and sheathing 109, test system 100 is configured to seal a portion of fluid line 101 extending in either direction from baffle 130. In embodiments of the invention comprising flat baffle webs, it is of little significance which side of the baffle is pressurized. In embodiments comprising baffles having domed webs, such as that shown in FIG. 2, it is preferred that test baffle 130 be oriented such that convex side 136 of web 134 is exposed to the test pressure during testing of the fluid line, so as to realize the structural advantages inherent in such a domed arrangement. Thus system 100 in FIG. 2 is oriented in the preferred disposition for testing that portion of fluid line 101 terminating in end 102.

Also shown in FIG. 2 is a means for removal of the baffle from the baffle carriage and from the fluid transfer system following testing of the system. The removal means facilitates removal of the baffle with dismantling and without damaging the fluid transfer system. In the embodiment shown, the removal system comprises lugs 170 and 171 attached to removal lines 174 and 174'. Removal line 174 is depicted as a string, and removal line 174' as a strap—as for example a nylon or other polymeric strap. Removal lines 174 and 174' are attached to the test baffle by means of eyes 173 in lugs 171 and 172. Line 174 is tied directly to the lug through the eye, while strap 174' is attached by means of connector 176. Alternatively, the removal baffle may be removed by insertion of a hook or other tool through eye 173, whereupon pulling on the hook or tool may result in removal of the baffle. Such a hook or other tool would engage the removal lug in much the same fashion as that of connector 176.

Figure 4B:
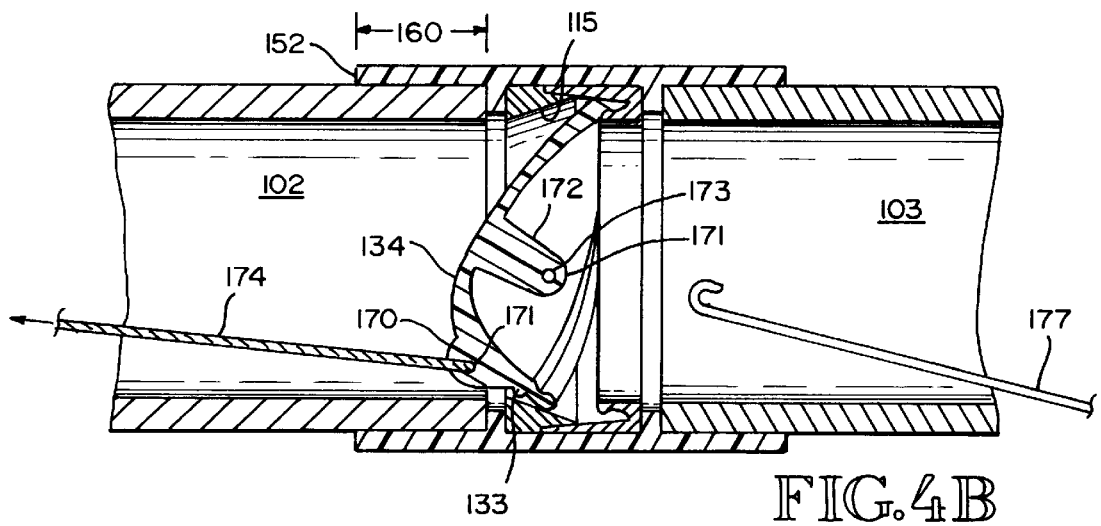
FIGS. 4a, 4b, and 4c are cross-sectional views of preferred embodiments of test systems according to the invention.
Figure 4A:
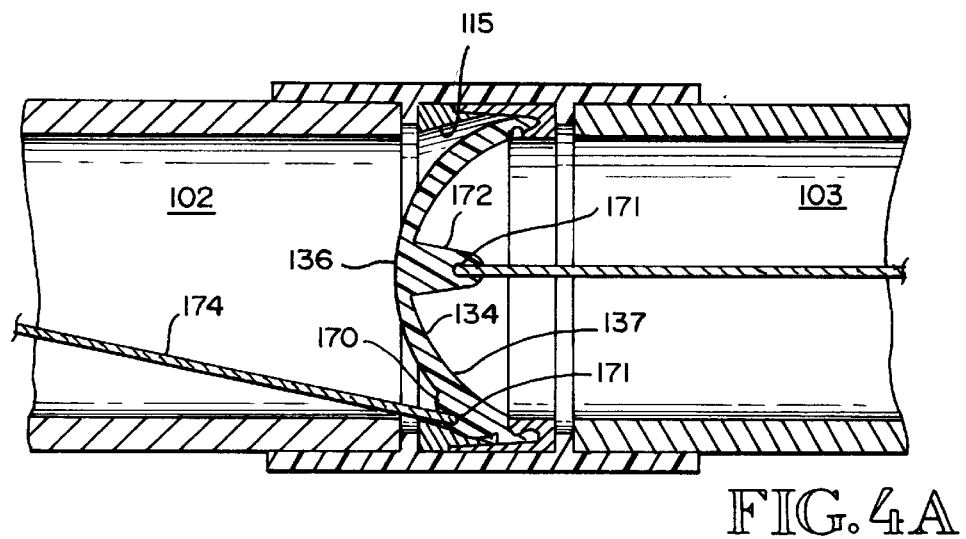
Figure 4C:
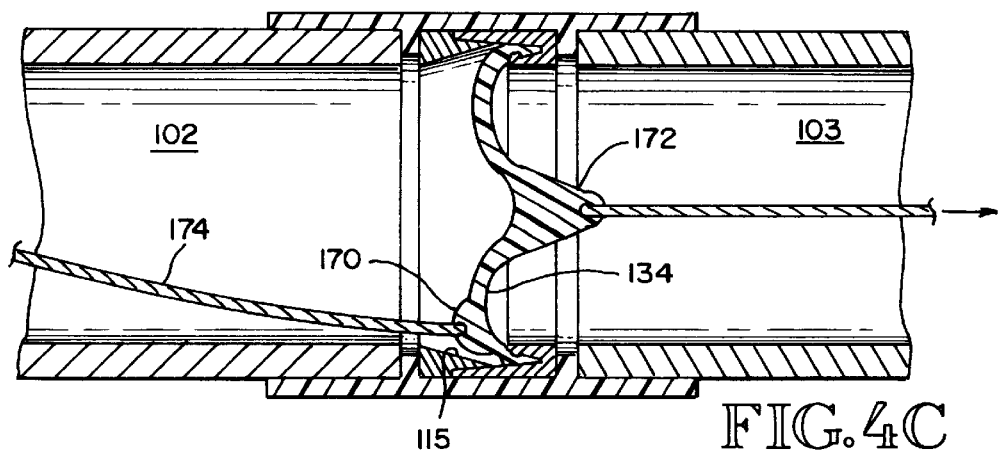
Figure 5:
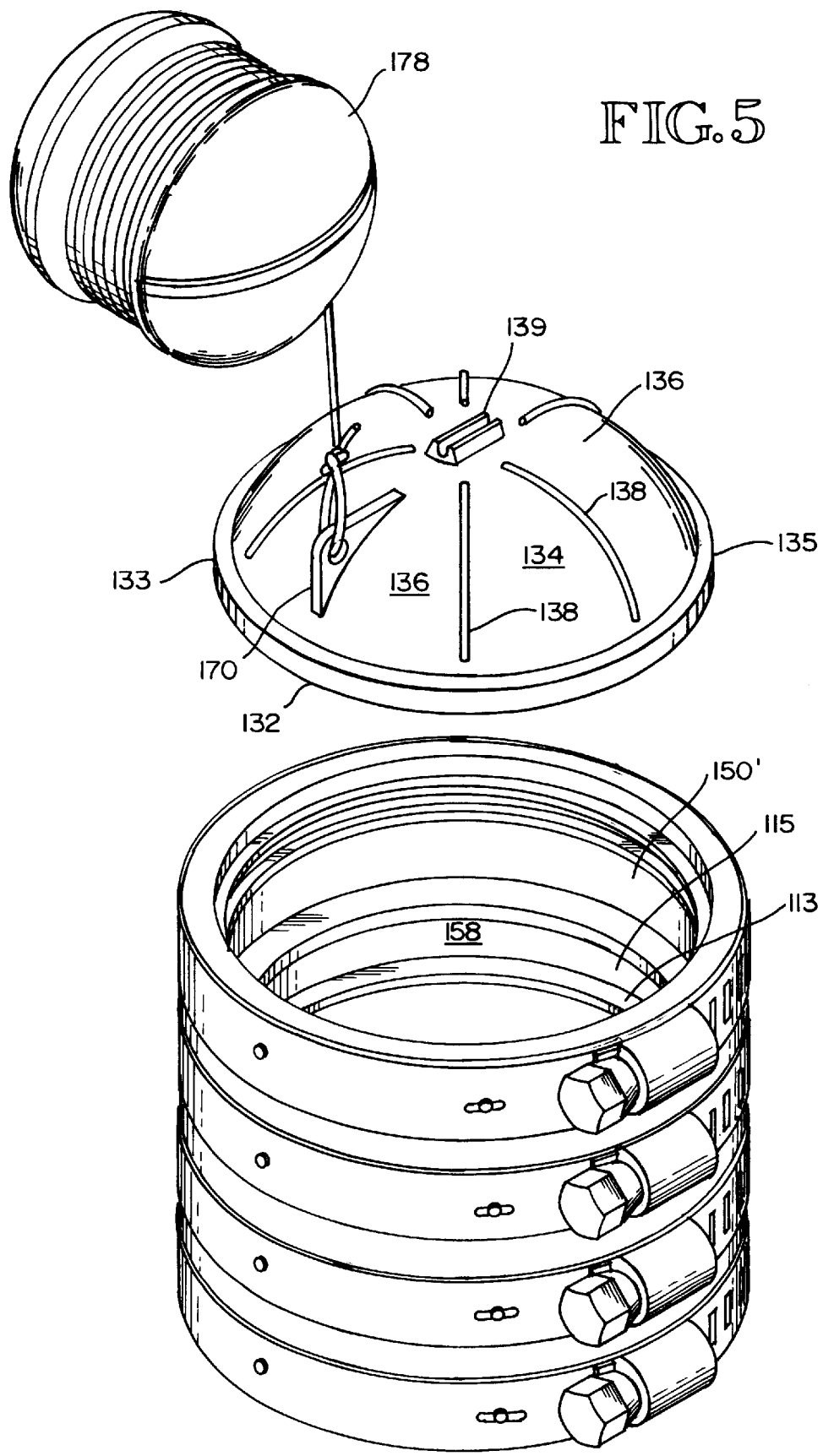
FIG. 5 is a perspective view of an alternative preferred embodiment of a test system according to the invention.

A preferred means for removing baffle 130 from the fluid line once testing has been completed is to pull it through by means of either of lugs 171 or 172 provided on either the pressurized or unpressurized side of the test baffle. For example, in FIGS. 4a, 4b, and 4c, lugs 170 and 171 are provided on both the convex and concave sides of dome 134. As stated, both lugs are provided with eyes 173 for engagement by a removal means such as a string or other line, as shown in FIG. 2, or by a retrieval hook 177 as shown in FIG. 4b. Retrieval hook 177 would extend to a clean-out port or other orifice communicating with the exterior of the system, such as an open pipe end. Preferred embodiments of the test baffle are further provided with means for retaining a string 174 attached to a removal lug in a desired position, typically near the center of the baffle, so that the string does not become fouled or trapped in an unwanted location during assembly of the fluid line. A preferred retaining means 139 is shown in FIG. 5. Retaining means 139 comprises a pair of raised parallel ridges spaced so as to provide an interfering fit and thus a releasable engagement for string 174. In embodiments of the invention provided with a pull string and intended for use with liquid-carrying fluid lines such as plumbing drains, a preferred optional addition is a float 178 (FIG. 5) attached to the free end of the string and disposed on installation of the baffle within the conduit at a location easily accessible following completion of the test, as for example as shown in my U.S. Pat. No. 4,936,350.

A particularly advantageous disposition of removal lugs provided on the convex side of domed test baffle 130 is proximate the perimeter of the baffle, as close to the edge of the baffle as is possible without causing the lug, other portions of the baffle, or the removal means to foul the side of the conduit during installation, testing, or removal. For example, lug 171 in FIGS. 4a, 4b, and 4c is located proximate perimeter 133 of on the convex side of baffle 130, in a position in which neither the lug nor removal means 174 will foul the inner surface of conduit member 102 when the baffle is removed. Placing the lug eccentrically is especially advantageous in that it has the effect, when the lug is pulled by a removal means, of concentrating the force applied to the baffle by the removal means to a relatively small section of the baffle, and to the seal provided to the conduit by the baffle, thus easing the breaking of the seal and the release of any residual pressure inside the tested fluid line through a localized breach. In addition, once any residual pressure has been allowed to bleed off through the breach in the seal, eccentric placement of the lug helps ensure that the baffle will be pulled back and flexed into a saddle shape inside the conduit suitable for easy removal of the baffle, without requiring undue force to pull the baffle through the conduit and with minimal danger of snagging pipe joints, etc. Lugs on the concave side of a baffle dome are preferably placed at or near the center of the dome, in order to best use the flexibility of the dome to collapse the dome and allow it to be pulled from the carriage, as shown in FIG. 4c.

The selection of a proper side of the baffle on which to attach a removal means is a simple matter dependent upon the nature of the fluid line to be tested and the conditions of the proposed test, and is well within the ability of those of ordinary skill in the art.

As the removable test baffle is of an outside diameter greater than the inside diameter of the pipeline in which it is installed, it is important that the baffle be flexible. Flexibility of the baffle facilitates its deformation so as to fit through the fluid transfer line once testing is complete. At the same time, however, it is advantageous that the baffle web be strong, so as to resist as much pressure within the fluid line during testing as possible. To this end it has been found advantageous to provide baffles according to the invention with a plurality of ribs extending radially from a center of said web to said perimeter. Such ribs are shown in FIG. 5. Ribs 138 radiate from the center of dome 134, which lies at or about the center of retaining means 139. Ribs 138 serve to strengthen dome 134 and increase its ability to withstand pressures within the fluid line, especially pressures applied to convex side 136. Ribs 138 are preferably molded, formed, or machined integral extensions of web 134.

Removal of the test baffle from the fluid transfer line is further facilitated by providing sidewall 114 of the baffle carriage with a frusto-conical annular surface such as surface 115 in FIGS. 1, 2, 3, 4a, 4b, 4c, and 6. As best seen in FIG. 4b, the frusto-conical annular shape of sidewall surface 115 aids perimeter 133 of the test baffle in leaving seat 113 and flexing upward into the interior of the fluid line so that the baffle may be removed completely.

As stated previously, central webs 134 of the baffle according to the invention may advantageously be provided in either flat or domed configurations.

Figure 6:
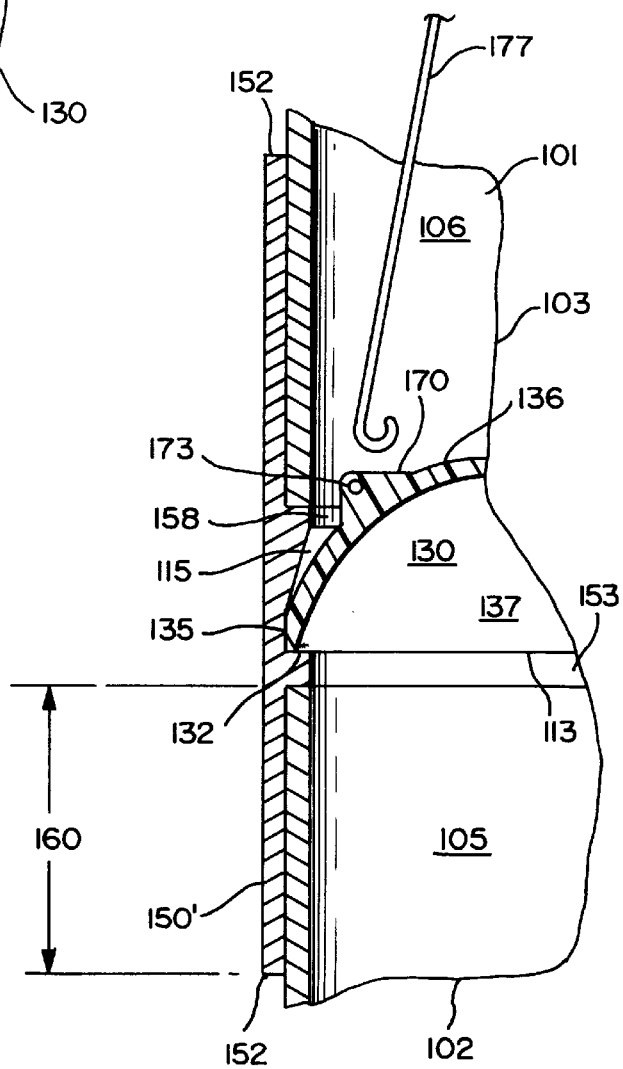
FIG. 6 is a partial cross-sectional view of an alternative preferred embodiment of a test system according to the invention.

FIGS. 5 and 6 show alternative combined embodiments of the sleeve and baffle carrier of the invention. Sleeve 150' serves the functions of both baffle carrier and sleeve. High pressure seal 132 of baffle 130 is adapted for engagement of seat 113 while second gasket or low pressure seal 135 engages sidewall 158, which comprises frusto-conical annular surface 115. Gasket 153 is disposed, following assembly of the apparatus, between end 102 of fluid line 101 and baffle 130, while surface 159 acts as a gasket and additional seal, in fashion similar to that of gasket 153, for end 103 of the fluid transfer line. Thus the same functions are performed by the assembly, in similar fashion, with fewer parts.

Figure 3:
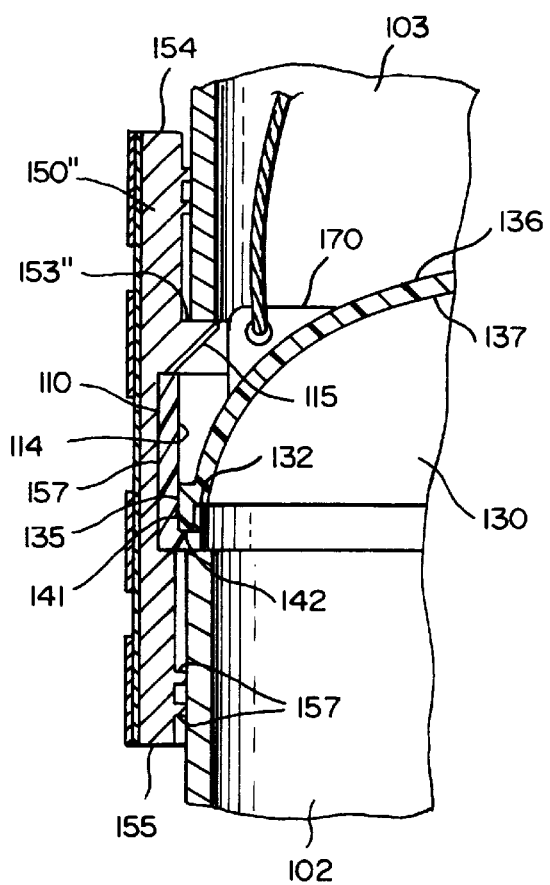
FIG. 3 is a partial cross-sectional view of an alternative preferred embodiment of a test system according to the invention.

FIG. 3 is a partial cross-sectional view of another alternative preferred embodiment of a test system according to the invention. Baffle carriage 110 comprises seat 113 (which includes channel 142) and sidewall 114, while sleeve 150" comprises frusto-conical surface 115 as an integral part of gasket 153". Sleeve 150" further comprises gaskets 157, which enhance the seal provided by sleeve 150" on tube ends 102 and 103 of the fluid line.

A preferred method for operation of a test system according to the invention is illustrated in FIG. 7. Fluid test system 100 is in place at and between sections 102 and 103 of fluid transfer line 101. Sleeve 150 holds carriage 110 and thereby baffle 130 in substantially co-axial alignment with the fluid line. Together the components of test system 100 provide a fluid-tight seal of the fluid line at the joint between sections 102 and 103 of the fluid line. With test system 100 in place, preferably with the convex portion of the domed baffle oriented toward the high-pressure side of the fluid line, fluid line 101 is filled with fluid 200 and the test is performed according to conventional procedures, which are well known to those in the industry. When the test is complete either of removal means 174 is pulled to release pressure behind the test baffle. As previously described, this is preferably accomplished by pulling the removal means just enough to release the fluid behind the test baffle, or to collapse the baffle; once pressure has been allowed to bleed off the baffle is removed entirely. If it is convenient or otherwise preferred, the test baffle may be removed via access or cleaning port 161, or by pulling the baffle out the other end of the fluid line by means of removal lug 172.

A test baffle having a removal lug comprising a frangible base portion is shown in FIGS. 8 and 9. Baffle 130 comprises removal lug 172, which in turn comprises a frangible base portion defined by score line 179. An initial pulling on removal lug 172 results in tearing along score line 179, so that surfaces 180 are exposed and a test pressure retained on the convex side of the baffle is allowed to drain or bleed off through the resultant breach, in a direction generally indicated by arrow 181. Continued tension on line 174 results in collapse of dome 134 as shown in FIG. 4c so that the baffle may be removed.

Figure 10:
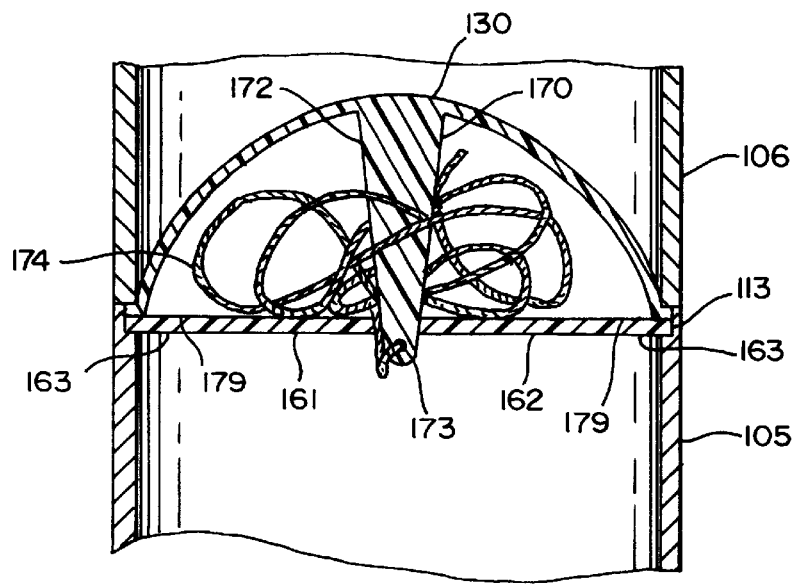
FIG. 10 is a schematic sectional view of a preferred embodiment of a test system according to the invention, comprising a retainer adapted for containing a removal line during installation of the test system.
Figure 11:
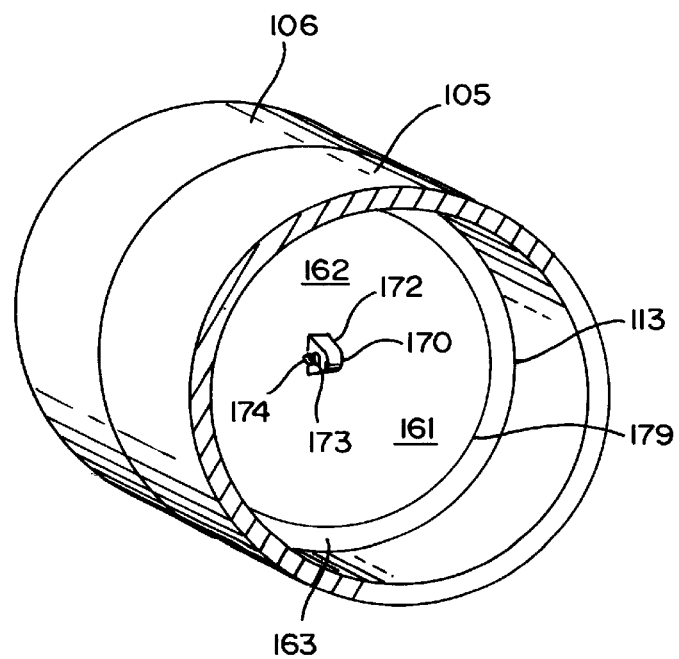
FIG. 11 is a schematic perspective view the test system shown in FIG. 10.

FIGS. 10 and 11 show an optional embodiment of the invention comprising a removable retainer for restraining a removal line attached to a lug on the baffle during installation of the test system. In the embodiment shown, baffle 130 and retainer 161 are in place within seat or channel 113 in fluid line section 105, effectively sandwiched between the ends of fluid line sections 105 and 106, and preferably adhered or attached to the rim or circumference of the test baffle to facilitate storage, handling, and installation of the test baffle and the removal means. In many cases it is seen to be more efficient or economical to provide a circumferential channel or the like in the test baffle itself, in order to facilitate storage, handling, and installation of the baffle and removal means. Lug 172 optionally protrudes through a central portion of web 162 of the retainer. Web 162 is optionally frangibly attached to rim 163 of retainer 161 and is easily removable by means of tearing the retainer out along circumferential score line 179. In many cases it is even simpler to merely provide a flexible or puncturable membrane which may be easily removed, as by hand or with aid of a screwdriver, awl, or other instrument. While it is in place, retainer 161 effectively contains removal line 174, so that the line is not fouled during installation, and does not interfere with the installation process. For ease of removability retainer 161 has been provided with tear out hole 164. To remove the retainer, the user inserts a finger or other tool through a hole provided for that purpose, or punctures web 161 and pulls web 162 away from the remainder of the retainer. If a rim 163 has been provided, it may be removed at the same time, or along with test baffle 130, or may be left in place indefinitely. Removal is optionally further facilitated by providing a membrane, in embodiments which use membranes, with a score line or other means for making the membrane frangible proximate inner circumference 312 of the baffle. In embodiments in which a membrane is used, the membrane may be solid (as shown) or perforated, or in any other suitable configuration.

The various components of the invention may be made from any material having qualities suitable for meeting the purposes suggested herein. It has been found particularly both economically and functionally advantageous, however, in building plumbing lines intended for draining wastewater, to fabricate conduit sections and baffle carriages from injection molded styrene, acrylonitrile butadiene styrene (ABS), polyvinyl chloride (PVC), and other common building plumbing materials. Test baffles and sleeves, including sleeves adapted to perform the function of the baffle carriage, are advantageously constructed of suitably strong but flexible materials such as natural or synthetic rubber or other suitable polymer. Where present, optional removal means retainers and storage membranes are made of materials similar to those used for the test baffle, or from cardboard, styrofoam, or any other suitable material.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention finds applicability in the isolation and interconnection of fluid transfer lines such as vent and wastewater systems where pressure testing of portions of the fluid line is required or useful.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A test system for non-destructive testing of the fluid-tight integrity of an installed fluid transfer line, the system comprising:

a baffle carriage adapted for disposition between ends of adjacent sections of a fluid transfer line and for releasably retaining a test baffle within an interior surface of the baffle carriage, said interior surface comprising a circumferentially disposed recessed seat and a recessed sidewall proximate said seat;

a removable test baffle having a diameter larger than an inner diameter of said ends of said fluid transfer lines, the test baffle comprising a first gasket, a perimeter, and a central web, the first gasket adapted to engage said seat, the perimeter comprising a second gasket adapted to sealingly engage said sidewall, and the central web attached to said gaskets in a fluid tight engagement; and a sleeve having an inner surface adapted to accept within an interior of said sleeve said baffle carriage and to sealingly engage outer surfaces of said sections of fluid transfer line, and thereby to hold said carriage in a substantially coaxial relation to said sections, said sleeve further comprising at its inner surface at least one integral gasket adapted for disposition between one of said ends of said sections and said baffle carriage, and to act as a gasket therebetween.

2. The test system of claim 1, wherein the perimeter of said baffle and said seat further comprise a dependent circumferential skirt and a circumferential channel adapted for releasable interengagement of said skirt by said baffle, whereby said baffle may be releasably attached to said carriage.

3. The test system of claim 1, wherein said central web comprises a pressure resistant dome.

4. The test system of claim 3, wherein said dome comprises a plurality of ribs extending radially from a center of said web to said perimeter.

5. The test system of claim 3, wherein said test baffle further comprises means for removal of the baffle from the carriage and the fluid transfer system following testing of said system, and without dismantling said system.

6. The test system of claim 5, wherein said means comprises at least one lug adapted to be engaged by a removal tool.

7. A test system for non-destructive testing of the fluid-tight integrity of an installed fluid transfer line, the system comprising:

a baffle carriage adapted for disposition between ends of adjacent sections of a fluid transfer line and for releasably retaining a test baffle, an interior surface of the baffle carriage comprising a circumferentially disposed recessed seat and a recessed sidewall proximate said seat;

a removable test baffle having a diameter larger than an inner diameter of said ends of said fluid transfer lines, the test baffle comprising a first gasket, a perimeter, and a central web; the first gasket adapted to engage said seat; the perimeter comprising a second gasket adapted to sealingly engage said sidewall; the central web attached to said gaskets in a fluid tight engagement and comprising a pressure resistant dome;

said baffle further comprising means for removal of the baffle from the carriage and the fluid transfer system following testing of said system, and without dismantling said system; said baffle removal means comprising at least one lug adapted to be engaged by a removal tool and having a frangible base portion; and a sleeve having an inner surface adapted to accept within an interior of said sleeve said baffle carriage and to sealingly engage outer surfaces of said sections of fluid transfer line, and thereby to hold said carriage in a substantially coaxial relation to said sections, said sleeve further comprising at its inner surface at least one integral gasket adapted for disposition between one of said ends of said sections and said baffle carriage, and to act as a gasket therebetween.

8. A test system for non-destructive testing of the fluid-tight integrity of an installed fluid transfer line, the system comprising:

a baffle carriage adapted for disposition between ends of adjacent sections of a fluid transfer line and for releasably retaining a test baffle, an interior surface of the baffle carriage comprising a circumferentially disposed recessed seat and a recessed sidewall proximate said seat;

a removable test baffle having a diameter larger than an inner diameter of said ends of said fluid transfer lines, the test baffle comprising a first gasket, a perimeter, and a central web; the first gasket adapted to engage said seat; the perimeter comprising a second gasket adapted to sealingly engage said sidewall; the central web attached to said gaskets in a fluid tight engagement and comprising a pressure resistant dome;

said baffle further comprising means for removal of the baffle from the carriage and the fluid transfer system following testing of said system, and without dismantling said system; said means comprising a first removal lug disposed upon a concave side of said dome and a second removal lug disposed upon a convex side of said dome, at least one of said lugs adapted to be engaged by a removal tool; and a sleeve having an inner surface adapted to accept within an interior of said sleeve said baffle carriage and to sealingly engage outer surfaces of said sections of fluid transfer line, and thereby to hold said carriage in a substantially coaxial relation to said sections, said sleeve further comprising at its inner surface at least one integral gasket adapted for disposition between one of said ends of said sections and said baffle carriage, and to act as a gasket therebetween.

9. The test system of claim 6, wherein said tool comprises a hook and said lugs comprise an eye adapted for reception of an end of said hook.

10. The test system of claim 6, wherein said tool comprises a removal line attached to said lug.

11. The test system of claim 6, wherein at least one of said lugs is disposed proximate said perimeter.

12. A test system for non-destructive testing of the fluid-tight integrity of an installed fluid transfer line, the system comprising:

a baffle carriage adapted for disposition between ends of adjacent sections of a fluid transfer line and for releasably retaining a test baffle, an interior surface of the baffle carriage comprising a circumferentially disposed recessed seat and a recessed sidewall proximate said seat, said sidewall comprising a frusto-conical annular surface adapted for facilitation of the removal of a test baffle;

a removable test baffle having a diameter larger than an inner diameter of said ends of said fluid transfer lines, the test baffle comprising a first gasket, a perimeter, and a central web, the first gasket adapted to engage said seat, the perimeter comprising a second gasket adapted to sealingly engage said sidewall, and the central web attached to said gaskets in a fluid tight engagement; and a sleeve having an inner surface adapted to accept within an interior of said sleeve said baffle carriage and to sealingly engage outer surfaces of said sections of fluid transfer line, and thereby to hold said carriage in a substantially coaxial relation to said sections, said sleeve further comprising at its inner surface at least one integral gasket adapted for disposition between one of said ends of said sections and said baffle carriage and to act as a gasket therebetween.

13. A sleeve of for a test system for non-destructive testing of the fluid-tight integrity of an installed fluid transfer line, the sleeve comprising:

an inner surface and two ends;

at least one of said ends having an inside diameter adapted for sealing engagement by the sleeve of an end of a fluid transfer line; and said inner surface comprising at least two integral gaskets, at least one of said gaskets adapted for engagement of an end of a fluid transfer line, said gaskets spaced so as to receive a baffle carriage and to hold, in conjunction with said inner surface of said sleeve, said baffle carriage in a substantially coaxial relation to said end of said fluid line.

14. A sleeve for a test system for non-destructive testing of the fluid-tight integrity of an installed fluid transfer line, the sleeve comprising:

an inner surface, two ends, and a sidewall, said inner surface comprising a circumferentially disposed recessed seat and a recessed sidewall proximate said seat, said seat and said sidewall adapted to releasably engage a test baffle and said sidewall comprising a frusto-conical annular surface adapted for facilitation of the removal of said test baffle;

at least one of said ends having an inside diameter adapted for sealing engagement by the sleeve of an end of a fluid transfer line; and said inner surface comprising at least one integral gasket adapted for engagement of an end of a fluid transfer line.

15. A baffle carriage adapted for disposition between ends of adjacent sections of a fluid transfer line for non-destructive testing of the fluid-tight integrity of said transfer line, the carriage comprising:

an interior surface, said interior surface comprising a circumferentially disposed recessed seat for sealingly engaging a gasket sealing element of a test baffle and a recessed sidewall, said sidewall proximate said seat and comprising a frusto-conical annular surface adapted for facilitation of the removal of said test baffle;

said seat and said sidewall adapted to releasably engage said test baffle in a sealing manner that reduces fluid leakage or fluid flow passage past said test baffle in a fluid transfer line.

16. A baffle carriage adapted for disposition between ends of adjacent sections of a fluid transfer line for non-destructive testing of the fluid-tight integrity of said transfer line, the baffle carriage comprising:

a first portion and a second portion;

said first portion having a circumferentially disposed recessed seat for sealingly engaging a gasket sealing element of a test baffle and a recessed sidewall, said sidewall being disposed proximate said seat, said seat and sidewall adapted for releasable engagement of a test baffle in a sealing manner that reduces fluid leakage or fluid flow passage past said test baffle in a fluid transfer line;

said second portion comprising a frusto-conical annular inner surface adapted for facilitation of the removal of said test baffle and a means for releasable engagement of said first portion.

17. A test system for non-destructive testing of the fluid-tight integrity of an installed fluid transfer line, the system comprising:

a removable test baffle comprising a perimeter, a central web attached to said perimeter, a seal disposed about said perimeter and adapted for sealing engagement of an inner surface of a fluid transfer line, and a removal means for removal of the baffle from the fluid transfer system following testing of said system without dismantling said system, said removal means comprising at least one lug comprising a frangible base portion and a removal line attached to said lug; and a retainer adapted to retain said removal line during handling and installation of the test system.

* * * * *